Oct. 4, 1966

L. G. GILBERT ETAL 3,276,304

CROSS WIRE LOCATING DEVICE

Filed May 6, 1964

INVENTOR.
LYLE GILBERT
THOMAS V. DEAGOSTINO
BY
Woodhams, Blanchard & Flynn
ATTORNEYS

United States Patent Office 3,276,304
Patented Oct. 4, 1966

3,276,304
CROSS WIRE LOCATING DEVICE
Lyle G. Gilbert and Thomas V. De Agostino, Bay City, Mich., assignors to National Electric Welding Machines Co., Bay City, Mich., a corporation of Michigan
Filed May 6, 1964, Ser. No. 365,398
17 Claims. (Cl. 83—150)

The invention relates to a locating device for an elongated element and, more particularly, relates to a continuously running device capable of transferring periodically inserted cross wires to preselected and evenly spaced stations on a conveyor running transversely with respect to said cross wires.

The device embodying the invention was developed for incorporation into a machine for assembling and welding reinforcing mats of the type used in concrete highways. The following discussion will refer to the invention in terms of such use for purposes of illustration only and such reference will in no way limit the invention which is adaptable to a wide range of other uses. The aforementioned machine is discussed in copending applications U.S. Serial No. 365,373 and No. 365,397 assigned to the assignee of the present invention which disclose in detail devices adapted for use therewith.

In said machine, a plurality of regularly spaced, parallel and essentially coplanar longitudinal wires are simultaneously advanced axially at a constant speed. A feeding device, such as that disclosed in the aforementioned application Serial No. 365,397, is provided for simultaneously advancing a plurality, usually a pair, of spaced, parallel and essentially coplanar cross wires axially. Such advance is transverse, and commonly at right angles, to said longitudinal wires and carries said cross wires to a location radially spaced from the longitudinal wires. Locating means including the device disclosed hereinbelow insure that the cross wires are of the correct length, prevent further axial motion of the cross wires and move said cross wires transversely into precisely spaced parallel location on a conveyor which in turn transfers said cross wires into positions fixed with respect to the moving longitudinal wires. Subsequently, means such as disclosed in the aforementioned application Serial No. 365,373 weld the moving cross and longitudinal wires together to form the desired grid or mat.

The mechanism in previous mat welding machines for moving cross wires into position for welding to a set of longitudinal wires has generally been disadvantageous for a number of reasons. First, previous machines are known wherein the longitudinal wires cannot be moved continuously through the machine but must rather be intermittently stopped due at least in part to the inability of the cross wire handling mechanism to locate cross wires with respect to moving longitudinal wires. This obviously results in slow production. Previous machines capable of continuously moving the longitudinal wires have often included cross wire handling mechanism having overly complicated cross wire transfer conveyors including complex spring welded wire gripping assemblies and have thus been relatively expensive to construct, and subject to both high construction and high maintenance costs.

Accordingly, the objects of this invention include:

(1) To provide a device for moving an elongated element transversely from a fixed position and smoothly into contact with transversely moving conveyor means.

(2) To provide a cross wire locating device for simultaneously receiving a plurality of cross wires in a precisely predetermined axial position, cutting the said wires to a precisely predetermined length, moving said wires in a transverse direction into precisely predetermined stations spaced on a conveyor.

(3) To provide a device, as aforesaid, constructed to allow rapid axial passage thereinto of said cross wires but allowing a relatively long period of time for said passage of said cross wires to prevent sudden acceleration or shocks to the device or the cross wire and to prevent excessively close occurrence of functions which might result in malfunction.

(4) To provide a device, as aforesaid, into which the cross wire is easily axially inserted despite flexing or minor bends therein and which precisely locates the inserted wire both radially and axially.

(5) To provide a device, as aforesaid, wherein transverse wire movement is positively controlled and is synchronized with movement of said conveyor and wherein said wire is both supported and retained at a plurality of relatively closely spaced locations along its length during transfer to prevent bending or breaking thereof and to insure consistent transfer throughout its length.

(6) To provide a device, as aforesaid, particularly adapted to simultaneously receive a plurality of cross wires and simultaneously feed same to said conveyor so that said conveyor can be rapidly filled without excessive velocity or rates of change of velocity of said cross wires.

(7) To provide a device, as aforesaid, including a conveyor of relatively simple construction, free of springs or complex additional mechanism.

(8) To provide a device, as aforesaid, which comprises a repeated number of relatively simple parts which are easily fabricated or widely available, which is readily assembled, which is economically manufactured in large or small quantities and which is capable of operation by inexperienced personnel with relatively little or no training.

(9) To provide a device, as aforesaid, which can be sturdily constructed for a long service life with little or no maintenance, which is easily maintained to the extent necessary, if at all, which is free of malfunction or faults during operation and which allows manufacture of mats of high and uniform quality.

Other objects and purposes of this invention will be apparent to persons acquainted with apparatus of this general type upon reading the following specification and inspecting the accompanying drawings.

Certain terminology will be used in the following description for convenience in reference only and is not limiting. The words "upwardly," "downwardly," "rightwardly" and "leftwardly" will designate directions in the drawings to which reference is made. The word "forwardly" will refer to the normal direction of net transverse material flow which is to the right in FIGURES 4 and 5 and the word "rearwardly" will refer to the opposite direction. The words "inwardly" and "outwardly" will refer to directions toward and away from, respectively, the geometric center of the device and the designated parts thereof. Said terminology will include the words above specifically mentioned, derivatives thereof and words of similar import.

GENERAL DESCRIPTION

In general, the objects and purposes of the invention are met by providing a cross wire locating device including means for initially locating at fixed positions a desired number of, usually at least two, parallel cross wires and assuring that said cross wires are cut to a predetermined length. Said device further includes a rotary transfer structure for moving each of said cross wires along a transverse path away from its fixed position. A conveyor moves tangentially of said path in synchronism with said rotary transfer structure and said rotary transfer structure deposits each cross wire at a precisely predetermined location on the conveyor and in time. Said rotary transfer structure includes means positively propelling said cross wires toward said conveyor against a resilient retarding force. Said path is precisely fixed and said cross wires are resiliently constrained to remain on said path to precisely control the motion of said cross wires.

DETAILED DESCRIPTION

Turning now to the drawings, the cross wire locating device 10 embodying the invention (FIGURES 1 and 2) is supported on a frame structure generally indicated at 11. The frame structure 11 may be of any convenient type but is here shown for purposes of illustration to comprise a spaced pair of preferably horizontal support beams 12 and 13 having a parallel supplementary beam 14 disposed therebetween. Said beams 12, 13 and 14 are connected by any convenient means such as welding to suitable rails 16 and 17 which may be an integral portion of a mat assembling and welding machine, if desired. An upstanding mounting plate 18 is affixed to the rightward ends of the beams 12 and 14 and supports the outlet end of any convenient wire feeding device, preferably that of my aforementioned copending application Serial No. 365,397. A plurality of mounting shoes 19 are supported on and between the beams 12 and 14 for supporting wire straighteners (not shown) for the longitudinal wires.

A conveyor 21 includes a conveyor shaft 22 parallel to the beam 12 and located therebelow and rearwardly thereof. The conveyor shaft 22 is rotatably supported by bearings 23 and 24 which are mounted on any convenient fixed means such as the rails 16 and 17, respectively. A transfer structure generally indicated at 26 includes a transfer shaft 27 and bearings 28 and 29 rotatably mounting same with respect to the beam 12. The transfer shaft 27 is spaced above and preferably forwardly of the conveyor shaft 22 and is parallel thereto. A gear box 31 depends from the leftward end of the beam 12 and rotatably supports a spaced pair of stub shafts 32 and 33 which extend toward and are coaxial with the shafts 22 and 27, respectively, and are coupled thereto by respective couplings 36 and 37. The stub shafts 32 and 33 have meshed gears 38 and 39, respectively, fixed thereto for rotating the shafts 22 and 27 in opposite angular directions. The gears 38 and 39 are preferably of equal pitch diameter to rotate the shafts 22 and 27 at the same speed. The conveyor shaft 22 carries a drive sprocket 41 near the bearing 23 which may be connected to any desired rotary prime mover. The drive sprocket 41 may also operate the wire locating device 10 in synchronism with a wire feeding device such as that of said afore-mentioned application Serial No. 365,397. To this end, a mechanical connection such as a chain 42 may be used to rotatably connect the drive sprocket 41 to a suitable sprocket on a lower shaft 44, said shaft 44 having fixed to it suitable means such as the pitman arm 46 for energizing such a wire feeding device, not shown.

The particular embodiment shown includes means for handling a pair of cross wires indicated in broken lines at 51 and 51a and thus provides a transfer structure 52 in addition to the afore-mentioned transfer structure 26. Except for the omission of a coupling comparable to the coupling 37 and parts located to the left thereof, the transfer structures 26 and 52 are substantially similar. Hence, parts of the transfer structure 52 will be referred to by the reference numerals designating corresponding parts of the transfer structure 26 but with the suffix "a" added thereto. Thus, the transfer structure 52 includes a shaft 27a rotatably supported by bearings 28a and 29a. The bearings 28a and 29a are fixed to the beam 13 preferably in the same manner that the bearings 28 and 29 are fixed to the beam 12 so that the shafts 27 and 27a are parallel and spaced. The shafts 27 and 27a carry respective radially aligned sprockets 53 and 53a which are preferably identical. A drive chain 54 connects the sprockets 53 and 53a so that the shafts 27 and 27a rotate at equal speeds in the same rotational direction. Idler means 50 of any convenient type may be used to tension the drive chain 54, if desired.

The conveyor 21 in the present embodiment comprises a spaced plurality of parallel chains 61 (FIGURES 2 and 5) supported at the rearward end of the wire locating device 10 by identical sprockets 62. Said sprockets 62 are supported for rotation with respect to the conveyor shaft 22 by suitable bearings 63 (FIGURE 3) axially fixed by the collars 64 and 66. The conveyor chain 61 is preferably supported forwardly of the transfer structure 52 by suitable drive sprockets 67 (FIGURE 5) whereby the upper reach 60 of the chain 61 is moved forwardly and is maintained straight by tension applied by said drive sprocket 67 and whereby said reach 60 passes the shafts 27 and 27a at equal distances therebelow. The chains 61 are preferably driven by the drive sprocket 67 at a speed such that the sprockets 62 and conveyor shaft 22 will rotate at essentially the same speed, such synchronism being achieved through any convenient mechanical connection of the shaft 22 and drive sprockets 67, here indicated by the broken line 68. The chains 61 each carries a plurality of receptacles 71 each having a generally U-shaped groove therein which opens upwardly when on the upper reach 60 of its chain 61. The receptacles 71 are preferably evenly spaced on the chains 61, said spacing being related in a predetermined way to the spacing of the shafts 27 and 27a. In the particular embodiment shown, the receptacles 71 are spaced on each chain 61 at one-third the spacing of the shafts 27 and 27a. The chains 61 are phased with respect to each other so that corresponding receptacles 71 thereon define a line parallel to the shaft 27.

Since the transfer structures 26 and 52 are substantially identical only one thereof need be described. The transfer structure 26 includes a plurality of essentially identical and spaced wire guides 76 (FIGURES 3 and 5) which are substantially of conventional construction. Each wire guide 76 comprises an upper half 77 and a lower half 78 defining therebetween a rightwardly opening funnel mouth 79 terminated at its leftward end in a leftwardly opening coaxial opening 81 which substantially provides a clearance fit for the wire 51. The halves 77 and 78 are preferably pivotally mounted forwardly of the funnel mouth 79 to allow separation of the rear ends of said halves. The wire guide 76 includes suitable means, not shown, for maintaining the halves 77 and 78 resiliently closed. The wire guide 76 further includes at the forward end thereof a mounting portion 82 (FIGURE 5) secured to a plate 86 on the rear side of the beam 12 by a T-bolt 87. The central axis of the funnel mouth 79 and opening 81 is parallel to the shaft 27 and spaced directly thereabove. Further, said central axis defines the path along which the wire 51 is axially inserted into the device 10. The resilient force holding halves 77 and 78 together is sufficiently light as to allow the wire 51 to be moved radially and rearwardly of the wire guide 76.

A severing device 101 (FIGURES 2 and 6) is mounted between the bearing 29 and the rightwardmost of the wire guides 76 for severing the wire 51 located in the wire guides 76 and in contact with the face 96 from the portion thereof lying to the right of the severing device 101. The severing device 101 may be of any convenient construction and is here shown for purposes of illustration to include a bracket 102 affixed to the upper face of the beam 12 by bolts 103 and extending rearwardly therefrom. A die holder 106 is fixed to the rearward end of the bracket 102 by screws 104 and threadedly supports an externally threaded cylindrical shear die 107 coaxially of the wire guides 76. The shear die 107 has a central opening 108 through which the wire 51 passes, the threaded engagement of the shear die 107 and the die holder 106 allowing axial adjustment therebetween to control the length of the cut-off wire 51 and the position of its rightward end with respect to the device 10.

A cut-off wheel 110 is affixed by any convenient means such as the key 111 and screw 112 to the shaft 27 for rotation therewith. The radially outer surface of the cut-off wheel 110 barely clears the wire 51. The cut-off wheel 110 carries a diametrically opposed pair of shear blocks 113 which extend radially outwardly therefrom sufficiently to contact the wire 51 and are axially placed in sliding contact with the inner end of the cut-off die 107 whereby a rotation of the shaft 27 will cause a shear block 113 to contact the wire 51 and move same past the face of the shear die 107 thereby severing said wire. Any axial thrust imparted to said shear block 113 by this cutting operation is resisted by the die holder 106. An inwardly extending flange on the shear block 113 is secured to the cut-off wheel 110 by a screw 114. The radially outer portion of the leading edge of the block 113 is preferably rounded for purposes appearing hereinafter.

Figures 9, 10:
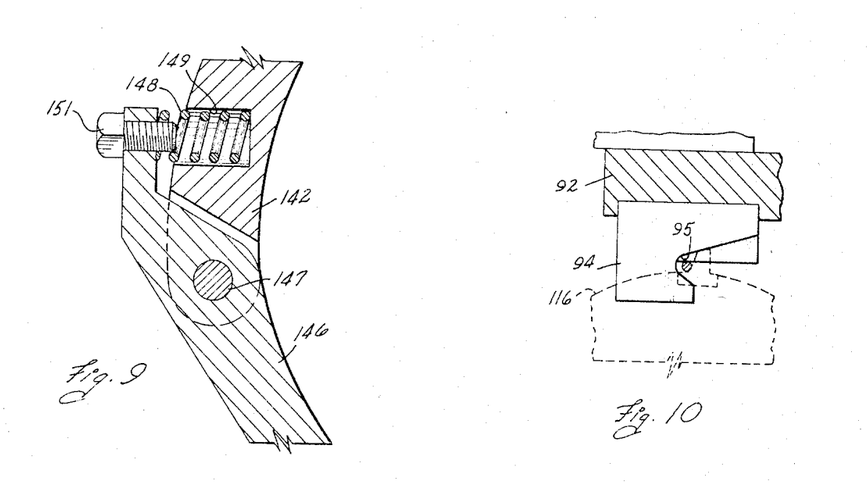
FIGURE 9 is an enlarged fragmentary sectional view taken on the line IX—IX of FIGURE 3.
FIGURE 10 is a fragmentary sectional view taken on the line X—X of FIGURE 2.

Severing means for the leading, or leftward, end of a given wire segment are provided at 91 and are generally similar to the severing means 101 just described. Hence, detailed description is not required, it being sufficient to note that a bracket 92 is affixed to the top of the beam 12 by bolts 93 and extends rearwardly therefrom over the shaft 27. The rearward end of the bracket 92 supports a guide block 94 having a rightward face 96 lying in a radial plane of the shaft 97, extending through somewhat more than the rearward half of a circle centered on the axis of said shaft 27, being of radial extent greater than the distance between the axes of the shaft 27 and the wire 51 and provided with a guide notch 95 (FIGURE 10). The guide block 94 is mounted for adjustment axially of the bracket 92 by screws 97, said axial adjustment being controlled by manipulation of an adjustment screw 98. Hence, the wire 51 can be moved leftwardly through the wire guide 76 until it projects into the notch 95 whereupon such movement is stopped by suitable control, or timing, of the feeding means as set forth in said application Serial No. 365,397. A cut-off wheel 116, which may be a mirror image of the cut-off wheel 110, is fixed to the shaft 27 closely adjacent the radial face 96 of the guide block 94 to trim the leading end of the wire segment against the block 94 and to urge the leftward end of the wire 51 to move as hereinafter further described with the rightward end of said wire. The trimmed end of the wire segment can be disposed of as convenient, such as by permitting it to fall by gravity out of the notch 95.

Figures 3, 6, 7:
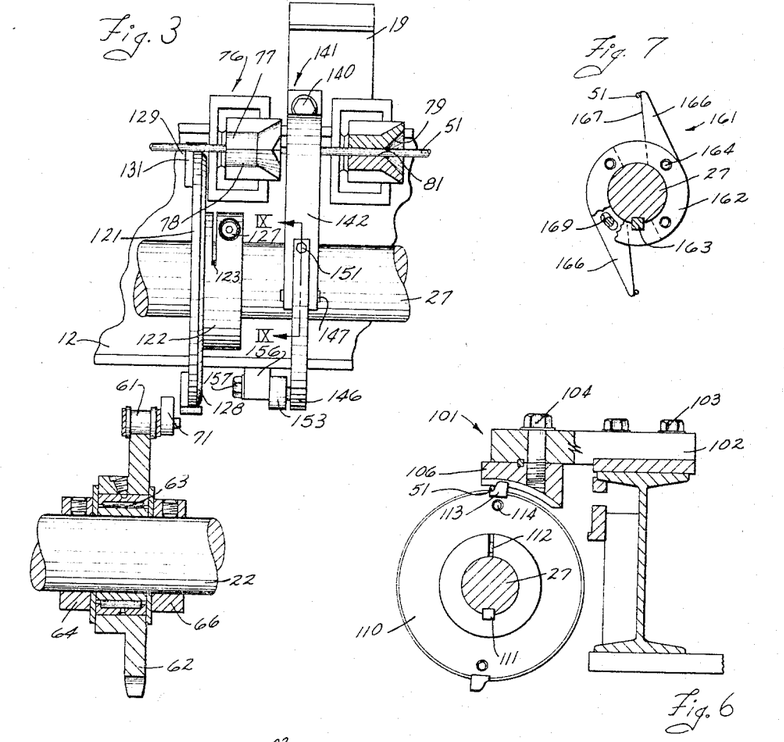
FIGURE 3 is an enlarged fragment of FIGURE 2.
FIGURE 6 is an enlarged sectional view taken on the line VI—VI of FIGURE 2.
FIGURE 7 is an enlarged, partially broken, sectional view taken on the line VII—VII of FIGURE 2.
Figure 4:
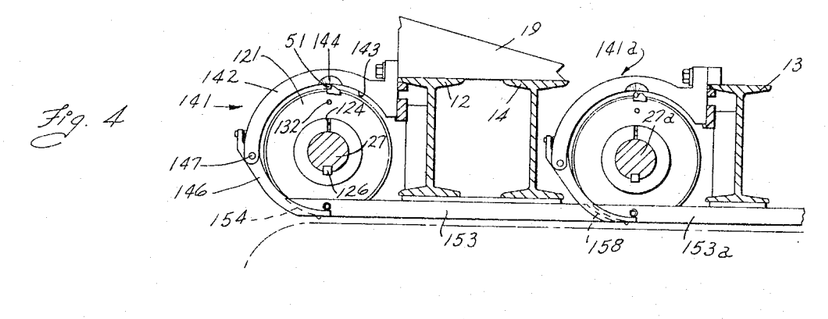
FIGURE 4 is a fragmentary sectional view essentially taken on the line IV—IV of FIGURE 1.
Figure 5:
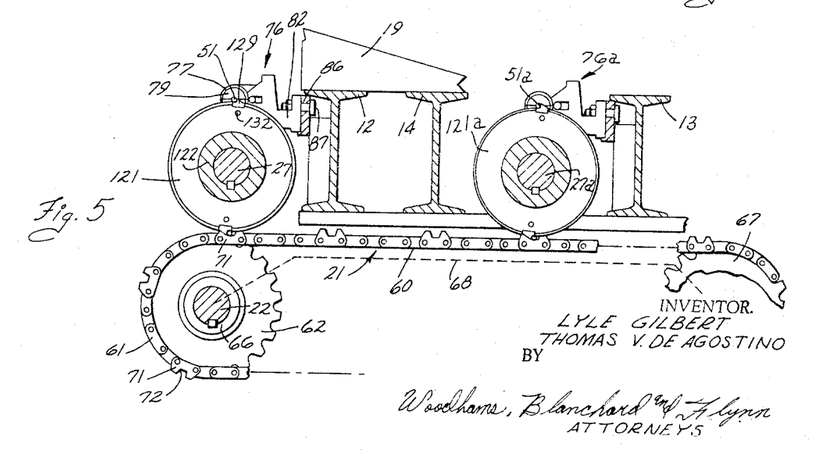
FIGURE 5 is a fragmentary sectional view essentially taken on the line V—V of FIGURE 1.

Novel means immediately hereinafter described are provided for removing the wire 51 from the wire guides 76 and placing same in a predetermined position on the moving conveyor 21. A plurality of circular transfer disks 121 (FIGURES 2, 3 and 5) each includes a hub portion 122 for affixing same to the shaft 27 for rotation therewith. The hub 122 has a radial slit 123 therein connected to the radial wall of the hub by an axial slit 124 (FIGURE 4). The hub 122 is fixed to the shaft 27 by a key 126. The hub 122 tightly grips the shaft 27 due to the constriction thereof by a screw 127 extending chordally therethrough and across the slot 124 between said radial slit 123 and said radial wall.

Figure 8:
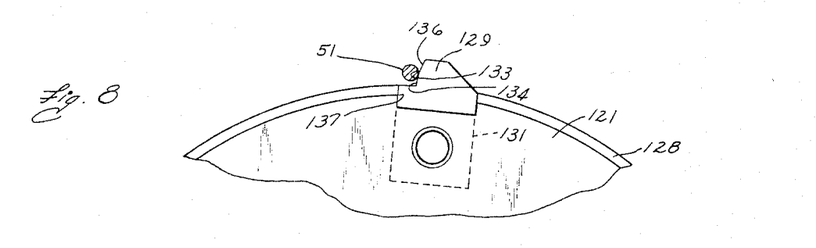
FIGURE 8 is an enlarged fragment of FIGURE 4.

The rightward and radially outer edge of each transfer disk 121 is chamfered at 128 (FIGURE 3) to allow unrestricted axial motion of the wire 51 therepast. The corresponding edges of wheels 116 and 110 are preferably chamfered in a similar manner. The circumference of each transfer disk 121 lies closely adjacent the wire 51. Each disk 121 carries a pair of diametrically opposed fingers 129 (FIGURES 3, 5 and 8) on its circumference which extend radially outwardly therepast for contacting the wire 51. The finger 129 has a radially inwardly extending flange 131 secured to the leftward radial face of the transfer disk 121 by a suitable screw 132. The fingers 129 are here recessed in the disk 121 in suitable recesses 137 to positively prevent movement thereof along the circumferential edge of the disk 121. The leading edge 133 of the finger 129 extends substantially radially outwardly from the circumference of the disk 121 as indicated at 134. The leading edge 133 curves convexly away from the portion 134 near the outer end thereof as indicated at 136 for purposes appearing hereinafter. Thus, the leading edge 133 is shaped similarly to a gear tooth of known type. The disks 121 are affixed to the shaft 27 at axially spaced locations thereon and are each preferably located closely adjacent the leftward end of a wire guide 76 to ease axial insertion of the wire 51 into the device 10 and to prevent excessive bending of the wire 51 by the fingers 129.

A spaced plurality of essentially semicircular transfer guide assemblies 141 (FIGURES 3, 4 and 9) are supported on the rear side of the beam 12 and between various ones, preferably all, of the transfer disks 121 and wheels 110 and 116. Each transfer guide assembly 141 includes an arcuate fixed member 142 rigidly affixed at its forward end to one of the mounting shoes 19 by a screw 140 and extending circumferentially around the shaft 27 to a point rearwardly spaced therefrom. The radially inner surface 143 of the fixed member 142 is concentric with the shaft 27 and is spaced therefrom for maintaining the wire 51 within reach of the fingers 129. The fixed member 142 has a semiconical guide surface 144 in the rightward face thereof coaxial with the guides 76 to assist leftward axial movement of the wire 51 therepast. A pin 147 in the rearward and lower end of the member 142 pivotally supports an arcuate pivoted member 146 for movement in a radial plane of the shaft 27. A spring 148 is received in a socket 149 in the fixed member 142 and bears rearwardly upon the upper end of the pivoted member 146 to urge the lower end thereof radially inwardly toward the lower surface of the shaft 27. A screw 151 locates the point of contact between the pivoted member 146 and spring 148. The pivoted member 146 extends downwardly to a point below the axis of said shaft 27. The lower end of the pivoted member 146 normally extends radially inwardly toward the shaft 27 to a distance less than the radius of transfer disk 121. Hence, the passage of the wire 51 along the inner surface of the pivoted member 146 due to rotation of the disk 121 and finger 129 requires a radially outward displacement of said pivoted member 146 by said wire. As a result, the wire 51 is resiliently held against the surface of the disks 121 and is resiliently prevented from moving ahead of or behind the finger 129 while in contact with the pivoted member 146.

A fixed guide rail 153 (FIGURES 3 and 4) has a bottom surface essentially tangent to the disks 121 and extending forwardly therefrom. The rear edge 154 of the guide rail 153 indicated in broken lines in FIGURE 4 is curved to correspond substantially to the axially aligned portion of the disks 121. A stop 155 (FIGURE 4) is fixed to the guide rail 153 between the shaft 27 and the pivoted member 146 to prevent movement of the pivoted member 146 therepast toward said shaft 27. A bar 156 is affixed under the beam 12 and supports the guide rail 153 by means of the bolts 157. A guide rail 153 thus located is preferably placed in close axial proximity to each of the transfer guide assemblies 141 for cooperating therewith in effecting transfer of the wire 51. Each guide rail 153 extends forwardly and has its forward end curved to correspond to the rearwardly facing curve of the guide rail 153a whereby a curved slot 158 is defined therebetween as indicated in broken lines in FIGURE 4.

The shafts 22 and 27 are preferably arranged so that the pitch diameter of the sprocket 62 is equal to the diameter of the disk 121 plus the diameter of the wire 51 so that the peripheral speeds of said wire 51 and the chain 61 will be equal, given equal rotational speeds of the sprockets 62 and disks 121. Further, the shaft 27 and chains 61 are preferably located so that the wire 51 will be moved by the disks 121 into the path of the grooves 72 in the receptacle 71. Still further, the chains 61 are phased with respect to the disks 121 so that the fingers 129 deposit the wires 51 into the grooves 72.

A plurality of transfer spiders 161 (FIGURES 2 and 7) assist the movement of the wires 51 by the disks 121 and wheels 110 and 116. Said transfer spiders 161 are disposed on the shaft 22 for rotation therewith between the disks 121. Each transfer spider 161 comprises a hub 162 keyed to the shaft 27 by a key 163. The hub 162 supports, by screws 164, a pair of substantially tangentially extending elements 166. The elements 166 preferably have circumferentially elongated holes 169 receiving said screws 164 to allow circumferential adjustment of said elements 166 on said hub 16. The elements 166 have working edges 167 for bearing on the wires 51 at the outer ends thereof. The working edges 167 are disposed between a tangential and radial location so as to urge said wires circumferentially and radially inwardly.

OPERATION

Figure 1:
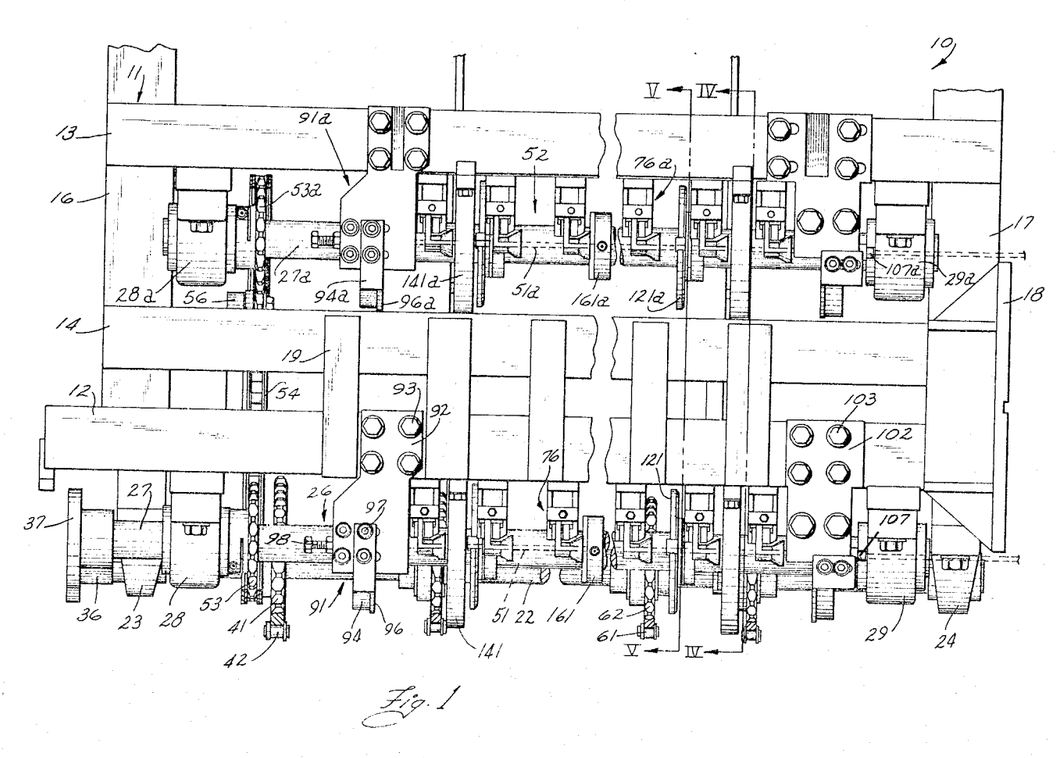
FIGURE 1 is a fragmentary top view of the cross wire locating device embodying the invention.
Figure 2:
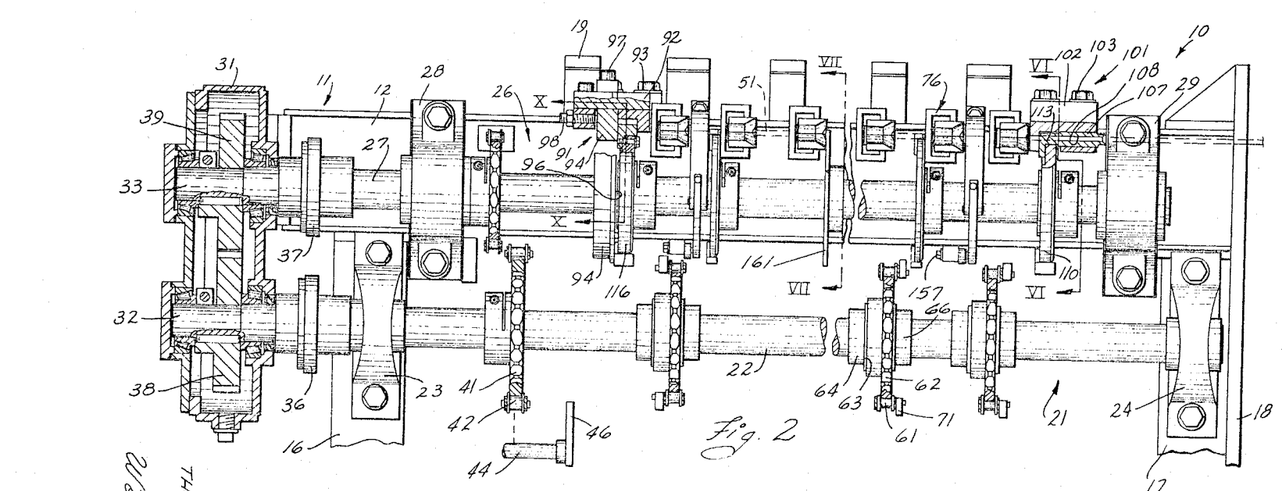
FIGURE 2 is a partially broken fragmentary front elevational view of the device of FIGURE 1.

Assuming the shafts 27 and 27a to be rotating in a counterclockwise direction as seen in FIGURE 4, wires 51 and 51a (or either one thereof alone, if desired) are fed simultaneously axially leftwardly as seen in FIGURES 1 and 2, by any convenient means, not shown, and into the shear dies 107 and 107a. Since the action on the wires 51 and 51a is substantially identical and simultaneous for the initial majority of a cycle in the operation of the device 10, only the operation upon the wire 51 need be described and such description will be understood to cover the wire 51a as well. The rotation of the shaft 27 is phased with respect to the axial wire travel so that the uppermost element 166 and finger 129 have rotated somewhat past their topmost position and no longer interfere with leftward (FIGURES 1 and 2) axial progress of the wire 51 through the wire guides 76. Thus, such axial movement of the wires continues until it is stopped by suitable control of the feeding means, as above mentioned. Said wire will remain undisturbed in this position until the next ones of the fingers 129 and elements 166 move into contact with the wire 51. At such time one of the shear blocks 113 on the cut-off wheel 110, and a corresponding one of the shear blocks on cut-off wheel 116, will also have moved into contact with said wire 51 and continued rotation of the shaft 27 will cause said shear blocks both to trim the leading end of the wire 51 and to shear the portion of the wire 51 to the left of the shear die 107 from the remainder of the wire held by wire feeding means, not shown. In cases where precut wires are fed to the device 10, the shear dies may be omitted but the wheels 110 and 116 may be retained to assist the disks 121 and spiders 166. This continued rotation has caused the elements 166 and more particularly the fingers 129 to exert a circumferential force on the wire 51 to remove same from the wire guides 76. The fixed members 142 of the transfer guide assemblies 141 prevent the wire 51 from skipping over the fingers 129. The wire 51 is free to move ahead of the fingers 129 along the circumferential surface of the disks 121 until it reaches the pivoted member 146 of the transfer guide assemblies 141. Here the wire 51 is resiliently held against further circumferential movement until the fingers 129 once again come in contact therewith to positively move the wire 51 onwardly along a circular path around the shaft 27.

The lower member 146 resiliently resists such continued movement and thus maintains the wire 51 snugly against the leading edge 133 of the fingers 129. Said lower member 146 also resiliently forces the wire 51 radially inwardly against the circumference of the disk 121 to resiliently constrain said wire 51 to said circular path. As the wire 51 approaches the 180-degree point in its circumferential travel, the guide rails 153 (FIGURES 3 and 4) receive the wire 51 therebelow so that said wire moves adjacent and along the curved rear edge 154 thereof. Since the rotation of the shaft 27 and of the shaft 22 are synchronized as hereinabove described, the groove 72 in one of the wire receptacles 71 on each chain 61 will move into axial alignment with the wire 51 as said wire 51 reaches the point in its semicircular path to which the path of the receptacle 71 is tangent. In the embodiment shown, axial alignment occurs as the wire 51 reaches the lowermost point in its travel and said wire 51 is deposited in the grooves 72. The wire 51 is prevented from jumping out of said grooves 72 by the close presence of the guide rail 153 thereabove. The curved portion 136 of the fingers 129 allows said fingers to readily release the wire 51 as the low point in its travel is passed and said finger 129 moves upwardly after completing a half-cycle in the rotation of shaft 27.

It will be obvious that a new wire 51 may be picked up during every half-revolution of the shaft 27 and that consequently a wire 51 will be placed on the conveyor 21 during each half-revolution of the shaft 22. Since the receptacles 71 are at the intended spacing of the cross wires in the finished mat and since this spacing corresponds to one-half the circumferential distance between the diametrically opposed fingers 129 on the transfer disk 121, the disk 121 will deposit a cross wire 51 in every second one of the receptacles 71. The shaft 27a is spaced three receptacle spacings from the shaft 27. Since the transfer disks 121 and 121a are in phase with respect to the positions of the fingers 129 and 129a thereon the disk 121a will deposit cross wires 51a in the receptacles 71 which were not filled by the disk 121. Thus, at any point in its operation after initiation thereof, the conveyor 21 as it moves forwardly from the disk 121a will be fully loaded with cross wires 51 and 51a. The particular drive arrangements shown in the accompanying drawings are preferably used in that they allow precise synchronism of the shafts 27 and 27a including the disks 121 and 121a and spiders 161 and 161a with the receptacles 71 and with whatever means are used to feed wires to the device 10.

Figure 11:
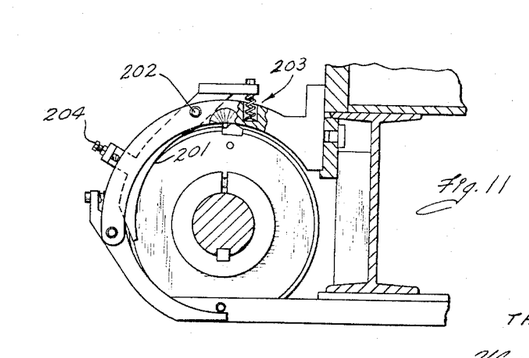
FIGURE 11 is a fragmentary view similar to FIGURE 4 and showing a modification.

In some instances, more exact guiding will be needed than is provided by the single resilient finger 146 on each of the guides 141 or 141a. In such case, as shown in FIGURE 11, an additional finger 201 may be provided on any desired number, usually all, of the guides 141 and 141a without otherwise changing the apparatus. Said finger 201 is pivoted at 202 onto the fixed upper guide member 142, terminates near the pivot point 147 of the lower guide member 146 and is itself biased toward the disk 121 in any convenient manner such as by the spring structure 203, said bearing being limited by the screw 204. Thus, each terminal segment of the cross wire 51 is held firmly against the disks 121 throughout its travel from the initial location in notch 144 to its point of deposit on the conveyor 61.

Although a particular preferred embodiment of the invention has been disclosed above for illustrative purposes, it will be understood that variations or modifications thereof which lie within the scope of the appended claims are fully contemplated.

What is claimed is:

1. In a transfer device for a wire, the combination comprising:
   a rotatable shaft;
   a plurality of axially spaced transfer disks coaxial with said shaft and affixed thereto for rotation therewith each having a plurality of spaced radially extending fingers affixed thereto;
   a plurality of arcuate guides affixed to said frame structure essentially coaxially of said shaft and axially spaced therealong, said guides being axially spaced from said disks and arranged between ones of said disks, and spaced closely outwardly from the path of said wire as it is urged circumferentially of said shaft by said fingers whereby to maintain said wire within radial access of said fingers as said fingers are rotated through the length of said guide toward the outlet end thereof.

2. The device defined in claim 1 including means for releasably holding said wire in the path of said fingers:
   a plurality of transfer spiders fixed to said shaft at points between ones of said transfer disks, said spiders having substantially radially extending elements racked in the direction of rotation of said shaft, the outer ends of said elements being axially aligned with said fingers for supporting portions of said wire between said disks during circumferential acceleration thereof from said holding means;
   means for axially leading a wire through said holding means and into the rotational path of said fingers and elements;
   fixed shearing means disposed beyond said holding means in the direction of shaft rotation and located axially beyond said disks and spiders and closely adjacent the outer most one of said disks so that movement of said wire by fingers of said outer disks past said shearing means, trims the ends from said wire.

3. The device defined in claim 1 in which each of said arcuate guides includes a segment extending to the outlet end of such guide, said segment being pivotally mounted with respect to the remainder of said arcuate guide and having resilient means urging said segment inwardly toward said shaft so that the outlet end thereof lies inwardly of the periphery of said disks but is readily displaceable outwardly by contact with a wire being moved therepast by said fingers.

4. In a locating device for a wire, the combination comprising:
   a frame structure;
   a plurality of rotating members and a shaft rotatably supporting same in spaced relation along the length of the wire with respect to said frame structure, said rotating members each having a radially extended finger;
   supporting members axially spaced from said rotating members and along the length of the wire for yieldably holding said wire in the path of said fingers and for allowing said fingers to remove said wire therefrom;
   a plurality of arcuate guides distributed along said wire fixed to said frame structure coaxially of said shaft, extending partially therearound axially spaced from and between said rotating members and supporting members and spaced closely outwardly from said wire for maintaining said wire within the radial reach of said finger through the length of said guide for assuring movement of said wire by said finger.

5. The device defined in claim 4 including:
   a receptacle and a linear conveyor mechanism synchronized with said shaft for moving said receptacle in a direction substantially tangential to the rotating members and into contact therewith; and
   an elongated guide rail extending along the path of said conveyor fixed with respect to said frame structure for maintaining said wire in contact with said receptacle in spite of movement of said finger away therefrom.

6. The device defined in claim 5 wherein said guide rail has an end adjacent said shaft, the plane of the surface of said guide rail away from said shaft being tangent to the periphery of the rotating member, the portion of said surface at the end of the rail being curved essentially at the radius of said rotating member and about the center of said shaft whereby said wire is led without interference around said end by said finger and said tangential surface strips said wire from said finger.

7. The device defined in claim 4 including:
   a rail extending chordally of said rotating member and having a guide surface which extends in one direction tangentially of said member and in the opposite direction in axial alignment with the periphery of said member and wherein said member defines a circular disk coaxial with said shaft; and
   said finger has a trailing edge and further has a leading edge for contacting said wire which comprises an essentially radial surface extending outwardly from the circumferential curve of said disk and a smoothly convexly curved portion extending outwardly from said radial surface and then toward said trailing edge of said finger, said radial portion of said leading edge positively driving said wire therewith as the disk rotates and said convexly curved portion allowing said wire to be readily stripped tangentially from said disk by said guide surface of said rail without material increasing the speed of said wire.

8. The device defined in claim 4 including coaxially aligned centering means on said supporting means and said guide, the axis of said centering means paralleling the axis of said shaft, said centering means facing in the same direction along said axis for sequentially receiving and centering the wire as it is passed axially therethrough.

9. The device defined in claim 4 wherein said arcuate guide comprises a fixed portion curved about and radially spaced from said shaft and supporting a pivoted portion at one end thereof, said pivoted portion curving around said shaft toward said conveyor mechanism and including means for resiliently urging the end of said pivoted portion nearest said conveyor inwardly beyond the radius of said rotating members toward said shaft whereby said wire is held radially and resiliently against said rotating member and circumferentially against said finger to positively regulate the motion of said wire.

10. The device defined in claim 9 including a further pivoted portion pivotally mounted on said fixed portion at a point spaced around said shaft away from said first mentioned pivoted portion, said further pivoted portion curving around said shaft toward said first mentioned pivoted portion and including means for resiliently urging the end of said further pivoted portion nearest said first mentioned pivoted portion inwardly beyond the radius of said rotating member toward said shaft whereby said further pivoted member holds said wire resiliently against said rotating member and circumferentially against said finger prior to contact of said first mentioned pivoted portion on said wire.

11. In a transfer device for moving a wire transversely from a stationary position, the combination comprising:
   a fixed frame structure;
   a plurality of axially spaced circular disks and a first shaft rotatably supported on said frame structure, said first shaft supporting said disks for rotation therewith, each of said disks having a plurality of radially extended fingers fixed thereto, said fingers being aligned axially of said first shaft;
   resiliently closed supporting means yieldably holding said wire in the path of said fingers and parallel to said first shaft for allowing said fingers to remove said wire therefrom, said supporting means being disposed at spaced locations along said first shaft, ones of said support means being located closely adjacent said disks;

a plurality of arcuate guides fixed to said frame structure coaxially of said shaft, closely axially offset from ones of said disks, extending partially therearound and spaced closely outwardly from said wire for maintaining said wire within the radial reach of said fingers as said fingers are rotated along said guide to assure movement of said wire by said fingers through the circumferential extent of said guides;

a conveyor having axially spaced parallel sections axially disposed between ones of said disks, each such section extending tangentially past said disks, said conveyor carrying a first plurality of receptacles thereon spaced therealong substantially at the circumferential distance of said fingers for movement substantially tangentially to the direction of movement of said wire by said fingers and means driving said conveyor and said first shaft in synchronism to allow said wire to be smoothly transferred from said fingers to said receptacles;

a plurality of parallel guide rails fixed with respect to said frame structure axially adjacent said arcuate guides, said guide rails being parallel with said conveyor and extending tangentially of said disks from a point between said conveyor and said shaft in the direction of conveyor travel for maintaining said wire in contact with said receptacle despite movement of said finger away therefrom.

12. A device defined in claim 11 including a second shaft similar to said first shaft and having a plurality of arcuate guides and disks associated therewith similar to said guides and disks associated with said first shaft; means driving said second shaft in synchronism with said first shaft; further receptacles interposing between said first mentioned receptacles on said conveyor and further guide rails for co-operating therewith to transfer wires held by said disks on said second shaft thereto said first and second shafts being spaced by a distance in excess of the radius of said disks, such distance being that between one of said first mentioned receptacles and one of said further receptacles.

13. The device defined in claim 12 in which said disks on said first and second shafts are equal in diameter and the fingers thereon are similarly spaced, in which each of said further receptacles is evenly spaced between a pair of said first mentioned receptacles and said first and second shafts are spaced at least one and one half times the spacing of said first mentioned receptacles.

14. In a transfer device for moving a wire transversely from a stationary position, the combination comprising:
 a fixed frame structure;
 a plurality of circular disks and a first shaft rotatably supported on said frame structure, said first shaft supporting said disks for rotation therewith, each of said disks having a plurality of radially extended fingers fixed thereto, said fingers being aligned axially of said first shaft;
 resiliently closed supporting means yieldably holding said wire in the path of said fingers and parallel to said first shaft for allowing said fingers to remove said wire therefrom;
 a plurality of arcuate guides fixed to said frame structure coaxially of said shaft, extending partially therearound and spaced closely outwardly from said wire for maintaining said wire within the radial reach of said fingers as said fingers are rotated along said guide to assure movement of said wire by said fingers through the circumferential extent of said guides;
 a conveyor carrying a first plurality of receptacles thereon spaced therealong substantially at the circumferential distance of said fingers for movement substantially tangentially to the direction of movement of said wire by said fingers and means driving said conveyor and said first shaft in synchronism to allow said wire to be smoothly transferred from said fingers to said receptacles;
 a plurality of parallel guide rails fixed with respect to said frame structure axially adjacent said arcuate guides, said guide rails being parallel with said conveyor and extending from a point between said conveyor and said shaft in the direction of conveyor travel for maintaining said wire in contact with said receptacle despite movement of said fingers away therefrom;
 a plurality of transfer spiders each comprising a hub portion fixed for rotation with said first shaft, said hub portion having circumferentially adjustably affixed thereto a plurality of substantially radially extending elements, the leading edges of said elements being sloped radially inwardly and circumferentially toward the trailing edge of said element;
 the outer end of said element extending radially outwardly sufficiently from said hub to engage said wire, said transfer spiders each being axially located between selected ones of said guides and said disks for assisting wire movement by said disks, whereby the inward and trailing slope of said leading edge prevents radially outward movement of said wires during circumferential urging thereof.

15. In a transfer device for moving a wire transversely from a stationary position, the combination comprising:
 a fixed frame structure;
 a plurality of circular disks and a first shaft rotatably supported on said frame structure, said first shaft supporting said disks for rotation therewith, each of said disks having a plurality of radially extended fingers fixed thereto, said fingers being aligned axially of said first shaft;
 resiliently closed supporting means yieldably holding said wire in the path of said fingers and parallel to said first shaft for allowing said fingers to remove said wire therefrom;
 a plurality of arcuate guides fixed to said frame structure coaxially of said shaft, extending partially therearound and spaced closely outwardly from said wire for maintaining said wire within the radial reach of said fingers as said fingers are rotated along said guide to assure movement of said wire by said fingers through the circumferential extent of said guides;
 a conveyor carrying a first plurality of receptacles thereon spaced therealong substantially at the circumferential distance of said fingers for movement substantially tangentially to the direction of movement of said wire by said fingers and means driving said conveyor and said first shaft in synchronism to allow said wire to be smoothly transferred from said fingers to said receptacles;
 a plurality of parallel guide rails fixed with respect to said frame structure axially adjacent said arcuate guides, said guide rails being parallel with said conveyor and extending from a point between said conveyor and said shaft in the direction of conveyor travel for maintaining said wire in contact with said receptacle despite movement of said finger away therefrom;
 a trimming means adjacent the leading end of said wire at a particular predetermined axial point and severing means spaced from said trimming means for severing said wire to segments of predetermined length, both said trimming means and said severing means having associated therewith wheels fixed for rotation to said first shaft and including a plurality of radially extending blocks having leading edges axially aligned with the leading edges of said fingers of said disks whereby to circumferentially urge the ends of said wire in one rotational direction in concert with circumferential urging of the mid-portion of the wire by said fingers on said disks.

16. A cross-wire feeding device comprising:

a plurality of spaced-apart, aligned wire guides having coaxial central openings whereby a wire can be fed lengthwise into said openings so that it can be simultaneously supported within said wire guides, said wire guides being openable in a direction transverse to the axis thereof whereby said wire can be discharged in a direction transverse to the axis of said wire guides;

a movable member having at least one extension movable therewith in a direction transverse to the axis of said wire guides, said extension being offset along said axis from said wire guides so that it can engage and move said wire out of said wire guides;

guide means for holding the wire in position for engagement with said extension after the wire has been moved out of the wire guide whereby the extension can move the wire to the point of use.

17. A cross-wire feeding device according to claim 16, in which each of said wire guides is of multi-part construction and includes means yieldably urging the parts of the wire guide together, said parts defining a completely enclosed central opening which is openable in a transverse direction when the parts separate against the urging of said yieldable means to permit the discharge of a wire; said movable member being rotatable about an axis parallel with the axis of said wire guides and said extension projecting radially from said member.

References Cited by the Examiner

UNITED STATES PATENTS

| | | | |
|---|---|---|---|
| 596,721 | 1/1898 | Schnabel | 83—592 X |
| 2,027,257 | 1/1936 | Vogt | 83—155 |
| 2,154,695 | 4/1939 | Phelps et al. | 83—155 |
| 3,067,644 | 12/1962 | Dearsley | 83—155 X |

FOREIGN PATENTS 855,122  11/1960  Great Britain.

WILLIAM W. DYER, JR., *Primary Examiner.*

F. T. YOST, L. B. TAYLOR, *Assistant Examiners.*